United States Patent
Choi et al.

(10) Patent No.: US 11,978,018 B2
(45) Date of Patent: May 7, 2024

(54) PROJECT MANAGEMENT SYSTEM WITH CAPTURE REVIEW TRANSMISSION FUNCTION AND METHOD THEREOF

(71) Applicant: Memorywalk Co, Ltd, Seoul (KR)

(72) Inventors: Jin Sung Choi, Uiwang-si (KR); Sang In Kim, Jeju-si (KR); Jong Ho Park, Incheon (KR)

(73) Assignee: Memorywalk Co, Ltd, Seoul (KR)

( * ) Notice: Subject to any disclaimer, the term of this patent is extended or adjusted under 35 U.S.C. 154(b) by 225 days.

(21) Appl. No.: 17/386,460

(22) Filed: Jul. 27, 2021

(65) Prior Publication Data

US 2022/0164774 A1 May 26, 2022

(30) Foreign Application Priority Data

Nov. 23, 2020 (KR) .......................... 10-2020-0157496
Jul. 27, 2021 (KR) .......................... 10-2021-0098245

(51) Int. Cl.
| | |
|---|---|
| *G06Q 10/10* | (2023.01) |
| *G06Q 10/06* | (2023.01) |
| *G06Q 10/0631* | (2023.01) |

(52) U.S. Cl.
CPC ... *G06Q 10/103* (2013.01); *G06Q 10/063114* (2013.01)

(58) Field of Classification Search
CPC ......... G06Q 10/103; G06Q 10/063114; G06Q 30/0276
See application file for complete search history.

(56) References Cited

U.S. PATENT DOCUMENTS

| | | | | |
|---|---|---|---|---|
| 5,537,524 A | * | 7/1996 | Aprile | ..................... G06T 17/00 345/440 |
| 6,671,692 B1 | * | 12/2003 | Marpe | ................... G06F 16/954 715/761 |

(Continued)

FOREIGN PATENT DOCUMENTS

| | | | | | |
|---|---|---|---|---|---|
| CN | 103620613 B | * | 6/2018 | .............. | G06F 11/00 |
| CN | 103597894 B | * | 10/2018 | .............. | H04L 67/32 |

(Continued)

OTHER PUBLICATIONS

Farzad Shafiei, "Multi-Enterprise Collaborative Enterprise Resource Planning and Decision Support Systems," 2004, Proceedings of the 37th Hawaii International Conference on System Sciences, pp. 1-10. (Year: 2004).*

(Continued)

*Primary Examiner* — Tan D Nguyen
(74) *Attorney, Agent, or Firm* — Park, Kim & Suh, LLC

(57) ABSTRACT

Disclosed are a project management system having a capture review transmission function for implementing an effective online review system and a method thereof. According to an embodiment of the inventive concept, a project management system is project management system for managing a project for producing content including a plurality of pieces of sub-content by division of labor and collaboration of a plurality of task managers and includes a project management unit that communicates with terminals of the plurality of task managers to manage the project. The project management unit includes a capture review processing unit that generates capture review data for sub-content worked by a task manager and transmits the capture review data to a terminal of the task manager.

14 Claims, 16 Drawing Sheets

(56) References Cited

U.S. PATENT DOCUMENTS

| | | | | |
|---|---|---|---|---|
| 7,006,978 B2* | 2/2006 | Lineberry | ............... | G06Q 10/04 |
| | | | | 705/7.15 |
| 2015/0290808 A1* | 10/2015 | Renkis | .................... | H04L 67/10 |
| | | | | 901/50 |
| 2018/0324229 A1* | 11/2018 | Ross | ..................... | G06F 3/1423 |

FOREIGN PATENT DOCUMENTS

| | | | | | |
|---|---|---|---|---|---|
| CN | 109032711 A | * | 12/2018 | | |
| CN | 109154935 A | * | 1/2019 | ......... | G06F 16/2465 |
| KR | 10-2008-0089573 A | | 10/2008 | | |
| KR | 10-2010-0104453 A | | 9/2010 | | |
| KR | 10-2014-0093827 A | | 7/2014 | | |
| WO | WO-2015132622 A1 | * | 9/2015 | ............. | G06F 16/51 |
| WO | WO-2018104834 A1 | * | 6/2018 | ............. | G06F 1/163 |

OTHER PUBLICATIONS

Tavis McCourt, "The Internet of Things," 2014, Raymond James Technology & Communications, pp. 1-12. (Year: 2014).*

Tony Grundy, "Strategy Implementation and Project Management" 1998, International Journal of Project Management, vol. 16, No. 1, pp. 43-50. (Year: 1998).*

Farzana Mir, "Exploring the value of Project Management: Linking Project Management Performance and Project Success," 2014, International Journal of Project Management, 32, pp. 202-217. (Year: 2014).*

"Introduction to Imageable", Naver blog, [online], Mar. 6, 2019, <URL: https://blog.naver.com/imgibble/221481835277>, 13pages.

Screen captures from YouTube video clip entitled "Video editor, confirmation officer, must-have! Can you mark and check the modifications in the video 'above'", 3pages, uploaded on Jan. 13, 2021 by user 'Editinggirl', retrieved from <URL: https://www.youtube.com/watch?v=EtthsW9_X98>.

* cited by examiner

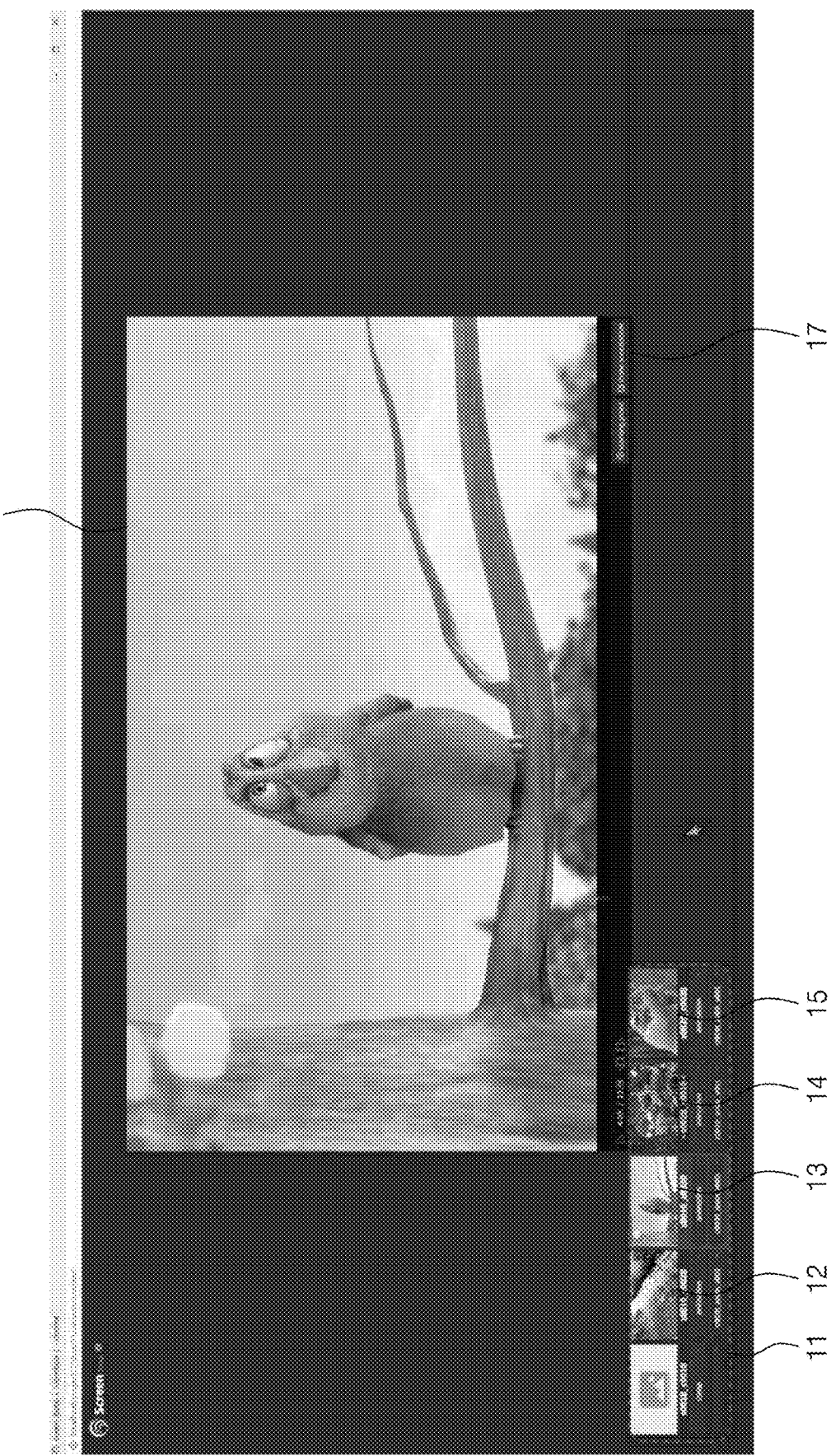

PROJECT MANAGEMENT SYSTEM WITH CAPTURE REVIEW TRANSMISSION FUNCTION AND METHOD THEREOF

CROSS-REFERENCE TO RELATED APPLICATIONS

A claim for priority under 35 U.S.C. § 119 is made to Korean Patent Application No. 10-2020-0157496 filed on Nov. 23, 2020, and No. 10-2021-0098245 filed on Jul. 27, 2021, in the Korean Intellectual Property Office, the entire contents of which are hereby incorporated by reference.

BACKGROUND

The inventive concept relates to a project management system and a method thereof, and more particularly, to a project management system having a capture review transmission function for implementing an effective online review system and a method thereof.

In general, content such as computer graphics, animations, and advertisement images are worked by workers who each play different roles. For example, animation is produced through various tasks such as an original drawing task by a drawing worker, a coloring task by a coloring worker, 3D modeling task by a 3D modeling worker, a screening and confirmation task by a screening worker (reviewer), and content production requires division of labor and collaboration among multiple workers.

Conventionally, there is a problem in that the sharing of task-related information between workers is not done smoothly, so that the worker has to check the task information to other workers individually, thereby reducing the efficiency of content production. For example, it frequently occurred that a team leader or manager separately inquired information such as pens and colors used for coloring workers or asked workers for detailed information such as cameras and lenses used for content production.

In this regard, when an online review (examination) system for content is implemented, certain files themselves such as Photoshop project files or broadcast video files with large and unsupported raw data are hardly checked in a web browser, and therefore, there was the inconvenience of having to convert a corresponding file into the format of other media files (videos) supported by the system, such as MP4, or MPEG and upload them, which limits the practical implementation and utilization of the online review system.

On the other hand, in a content production process, several pieces of sub-content are distributed to and produced by workers in units such as shots and scenarios, and a screening worker connects the pieces of sub-content produced by the workers and then reproduces the pieces of sub-content to determine whether the connection of the pieces of sub-content is natural. Such a screening task has a limitation in that the screening worker cannot conveniently execute the screening function while converting the sub-content into various versions.

On the other hand, in the prior art, in the process of a content production project, it was difficult to check the execution rate for each task for content production or the progress of each worker's task, and the tasks were concentrated on a specific worker, thereby delaying the content production schedule. In addition, it was difficult for a worker to figure out the priority of the tasks assigned to the worker, so that the worker performs the tasks in the order in which tasks are assigned, which caused a problem in that the progress of tasks with high priority was delayed.

SUMMARY

Embodiments of the inventive concept provide a project management system having a capture review transmission function for implementing an effective online review system and a method thereof.

Embodiments of the inventive concept provide a project management system capable of efficiently sharing task-related information among task managers in a process of producing content by division of labor and collaboration and a method thereof.

Embodiments of the inventive concept provide a project management system capable of efficiently managing tasks by easily figuring out task progress of each task and each task manager and the task priority of the task manager and a method thereof.

According to an exemplary embodiment, a project management system is project management system for managing a project for producing content including a plurality of pieces of sub-content by division of labor and collaboration of a plurality of task managers and includes a project management unit configured to communicate with terminals of the plurality of task managers to manage the project. The project management unit includes a capture review processing unit configured to generate capture review data for sub-content worked by a task manager and transmit the capture review data to a terminal of the task manager.

The capture review processing unit may include a capture input unit that receives review data and a capture execution command for the sub-content displayed on a terminal of a reviewer who performs a review task for the sub-content, a capture execution unit that captures a display screen including the sub-content and the review data displayed on the terminal of the reviewer to obtain the capture review data, a capture stack processing unit that stores the capture review data in a capture stack storage unit in units of sub-content according to sub-content related to the capture review data, and a capture transmission processing unit that collectively transmits one or more pieces of capture review data stored in the units of sub-content to a terminal of a task manager related to the sub-content.

The capture review data may include at least one of a capture image obtained by capturing a screen of the terminal of the reviewer and a recorded video obtained by recording the screen of the terminal of the reviewer.

A storage location in which the capture review data is stored in the capture stack storage unit may be automatically determined according to the sub-content.

The capture review processing unit may further include a review data extraction unit that extracts the review data by comparing capture data obtained at a first capture time point and the capture review data obtained at a second capture time point, a task information generation unit that identifies task instruction information and a task instruction part from the extracted review data and automatically generates task information for the sub-content, and a task list adding unit that automatically adds the task information for the sub-content to a task list of the task manager when the capture review data is transmitted.

The capture review processing unit may include a task part link unit that automatically links the task information to a task instruction part of sub-content to be worked when the task manager selects the task information from the task list, a task execution determination unit that determines whether the task information is executed by comparing the sub-content before the task manager performs the task and the task instruction part of the sub-content after the task manager has performed the task, and a task execution display unit that displays whether the task information for the sub-content has been completed on the task list of the task manager.

According to an exemplary embodiment, a project management method for managing a project for creating content including a plurality of sub-content by division of labor and collaboration of a plurality of task managers, includes performing, by a capture review processing unit, a capture review transmission function of generating capture review data for sub-content worked by a task manager and transmitting the capture review data to a terminal of the task manager.

The performing of the capture review transmission function may include receiving, by a capture input unit, review data and a capture execution command for the sub-content displayed on a terminal of a reviewer who performs a review task for the sub-content, capturing, by a capture execution unit, a display screen including the sub-content and the review data displayed on the terminal of the reviewer to obtain the capture review data, storing, by a capture stack processing unit, the capture review data in a capture stack storage unit in units of sub-content according to sub-content related to the capture review data, and collectively transmitting, by a capture transmission processing unit, one or more pieces of capture review data stored in the units of sub-content to a terminal of a task manager related to the sub-content.

The performing of the capture review transmission function may include extracting, by a review data extraction unit, the review data by comparing capture data obtained at a first capture time point and the capture review data obtained at a second capture time point, identifying, by a task information generation unit, task instruction information and a task instruction part from the extracted review data to automatically generate task information for the sub-content, and automatically adding, by a task list adding unit, the task information for the sub-content to a task list of the task manager when the capture review data is transmitted.

The performing of the capture review transmission function may include automatically linking, a task part link unit, the task information to a task instruction part of sub-content to be worked when the task manager selects the task information from the task list, determining, a task execution determination unit, whether the task information is executed by comparing the sub-content before the task manager performs the task and the task instruction part of the sub-content after the task manager has performed the task, and displaying, a task execution display unit, whether the task information for the sub-content has been completed on the task list of the task manager.

According to an embodiment of the inventive concept, there is provided a non-transitory computer-readable recording medium recording a program for executing the project management method.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 10A and 10B are exemplary views for describing the function of a content version management unit constituting a project management system according to an embodiment of the inventive concept;

DETAILED DESCRIPTION

Figure 1:
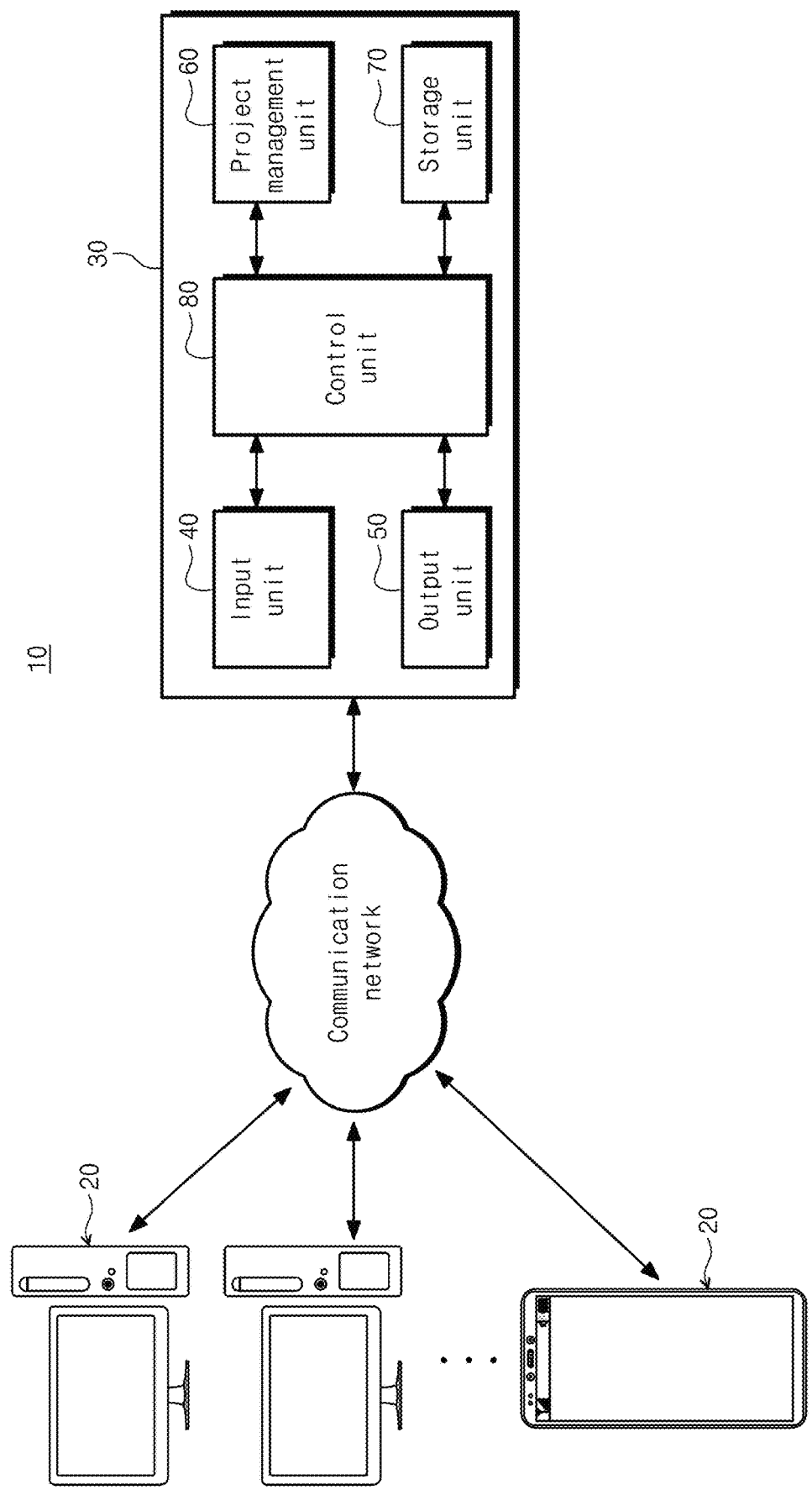
FIG. 1 is a conceptual diagram of a project management system according to an embodiment of the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims. Like reference numerals refer to like elements throughout the specification.

In the present specification, when a part 'includes' a certain component, it means that other components may be further included, rather than excluding other components, unless otherwise stated. As used herein, '~ unit' is a unit for processing at least one function or operation, and may refer to, for example, software, FPGA, or hardware component. A function provided by '~ unit' may be performed separately by a plurality of components, or may be integrated with other additional components. As used herein '~ unit' is not necessarily limited to software or hardware, and may be configured to reside in an addressable storage medium, or may be configured to reproduce one or more processors. Hereinafter, an embodiment of the inventive concept will be described in detail with reference to the drawings.

A project management system according to an embodiment of the inventive concept may have a capture review transmission function for the implementation of an effective online review system. The project management system according to the embodiment of the inventive concept may perform a function of generating capture review data by inputting a capture execution command for a screen of the terminal of a reviewer on which review data input by the reviewer for sub-content worked by a task manager and the sub-content are displayed, storing the capture review data in the capture stack store unit in units of sub-content and collectively transmitting one or more pieces of capture review data stored in the capture stack store unit in units of sub-content to a sub-content related task manager.

FIG. 1 is a conceptual diagram of a project management system according to an embodiment of the inventive concept. Referring to FIG. 1, a project management system 10 according to an embodiment of the inventive concept may include terminals 20 of a plurality of task managers and a project management server 30. Some of the task managers may be reviewers who review content worked by the task managers.

The terminals 20 of the task managers are terminals of task managers (team leader, supervisor, coloring staff, composition/3D model staff, reviewer, advertiser, or the like) having different roles for project execution by division of labor and collaboration. The terminals 20 may be provided as terminals such as a desktop PC, a laptop, a notebook computer, a smart phone, and a smart pad, but is not limited thereto.

The project management system 10 according to an embodiment of the inventive concept may manage a project for creating content including a plurality of sub-content by division of labor and collaboration of a plurality of task managers.

The project management server 30 may communicate with the terminals 20 through a wired/wireless communication network to provide a function of managing a project. The project management server 30 may include an input unit 40, an output unit 50, a project management unit 60, a storage unit 70, and a control unit 80.

The input unit 40 may receive content worked by task managers using the terminals 20 or sub-content constituting the content. Also, the input unit 40 may receive annotations or comments related to content and/or sub-content, and feedback related to a screening function from the terminals 20.

The output unit 50 may output, to the terminals 20, pieces of content or sub-content, capture review data written by a reviewer for sub-content worked by the task manager, or an annotation or comment input in relation to the content, a feedback related to a screening function, information related to task progress (e.g., task progress rate, statuses of tasks in progress or scheduled), various kinds of task related notifications, or the like.

The project management unit 60 may manage a project through a series of processing such as a capture review transmission function, task creation for content production, task distribution, task support, task-related annotation/comment sharing, content production task support, content upload/version management, content execution, screening, task progress information analysis, notification transmission or the like.

The storage unit 70 may store programs or various information for executing functions such as a capture review transmission function, project management, and content execution/screening of the project management unit 60, for example, task information for content production, task distribution information, annotation history, uploaded content, content version information, task progress information, notification information, and the like.

The control unit 80 may include a processor for controlling the input unit 40, the output unit 50, the project management unit 60, and the storage unit 70 to execute a project management function (creation/distribution of content production tasks, task support, annotation/comment sharing, content upload/version management, content execution/screening, task progress information analysis, notification transmission, or the like).

In an embodiment, the content may include at least one of computer graphics, animation, and advertisement videos. The content may include two or more multiple sub-content. A plurality of pieces of sub-content may include first sub-content and second sub-content which are continuously reproduced with time.

In this case, the last frame of the first sub-content and the first frame of the second sub-content may be consecutive frames in the content. Final content may be produced through a process of combining two or more first sub-content and second sub-content.

The first tasks may include an original drawing task, a coloring task, a 3D modeling task, and a confirmation (or rejection determination) task for production of the first sub-content. The second tasks may include an original drawing task, a coloring task, a 3D modeling task, and a confirmation (or rejecting determination) task for producing the second sub-content.

The project management unit 60 may generate first tasks to be sequentially performed in time series to produce the first sub-content. Also, the project management unit 60 may generate second tasks to be sequentially performed in time series to produce the second sub-content.

The project management unit 60 may distribute the first tasks to first task managers according to task attributes of the first tasks and roles set for the task managers. In addition, the project management unit 60 may distribute the second tasks to second task managers according to task attributes of the second tasks and roles set for the task managers.

The task properties of the tasks may include various attribute information related to tasks, such as a type of task (drawing, coloring, 3D modeling, screening confirmation/rejection, or the like), a type of content produced by tasks (computer graphics, animation, advertisement video, or the like), and a type of tool used for the task (camera, editor, 3D modeling program, or the like).

The project management unit 60 may perform a capture review transmission function of storing capture review data captured by the terminal of a reviewer who reviews the sub-content in a storage location set in units of sub-content and transmitting one or more pieces of capture review data in units of sub-content to the terminal of the task manager who has worked on the sub-content at a time according to a capture review transmission command of the reviewer.

If necessary, the project management unit 60 may share the annotations or comments input for the first sub-content among the first task managers when the first tasks are being sequentially performed. In addition, the project management unit 60 may share the annotations or comments input for the second sub-content among the second task managers when the second tasks are being sequentially performed.

The project management unit 60 may perform a screening function of connecting and reproducing pieces of sub-content produced by division of labor and collaboration by a plurality of task managers, that is, first sub-content produced through the first tasks and second sub-content produced through the second tasks.

Figure 2:
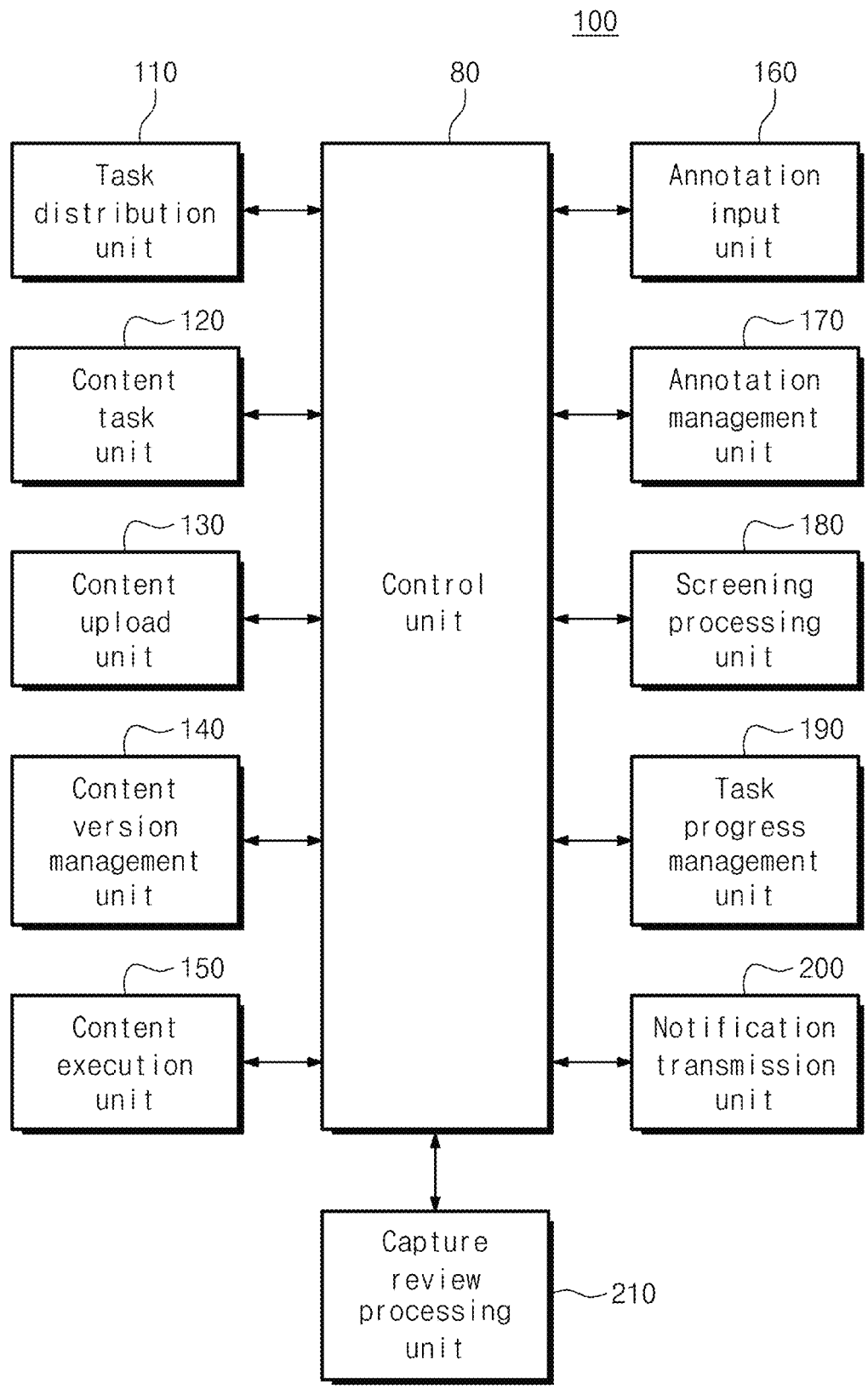
FIG. 2 is a configuration diagram of a project management system according to an embodiment of the inventive concept.

FIG. 2 is a configuration diagram of a project management system according to an embodiment of the inventive concept. Referring to FIGS. 1 and 2, a project management system 10 may include a project management device 100. The project management device 100 may correspond to the project management unit 60 of FIG. 1.

The project management device 100 may include a task distribution unit 110, a content task unit 120, a content upload unit 130, a content version management unit 140, a content execution unit 150, an annotation input unit 160, an annotation management unit 170, a screening processing unit 180, a task progress management unit 190, a notification transmission unit 200, and a capture review processing unit 210.

First, the capture review processing unit 210 will be described. The capture review processing unit 210 may perform a function of generating capture review data by inputting a capture execution command for a screen of the terminal of a reviewer on which review data input by the reviewer for sub-content worked by a task manager and the sub-content are displayed, storing the capture review data in the capture stack storage unit in units of sub-content and collectively transmitting one or more pieces of capture review data stored in the capture stack storage unit in units of sub-content to a sub-content related task manager.

Figure 3:
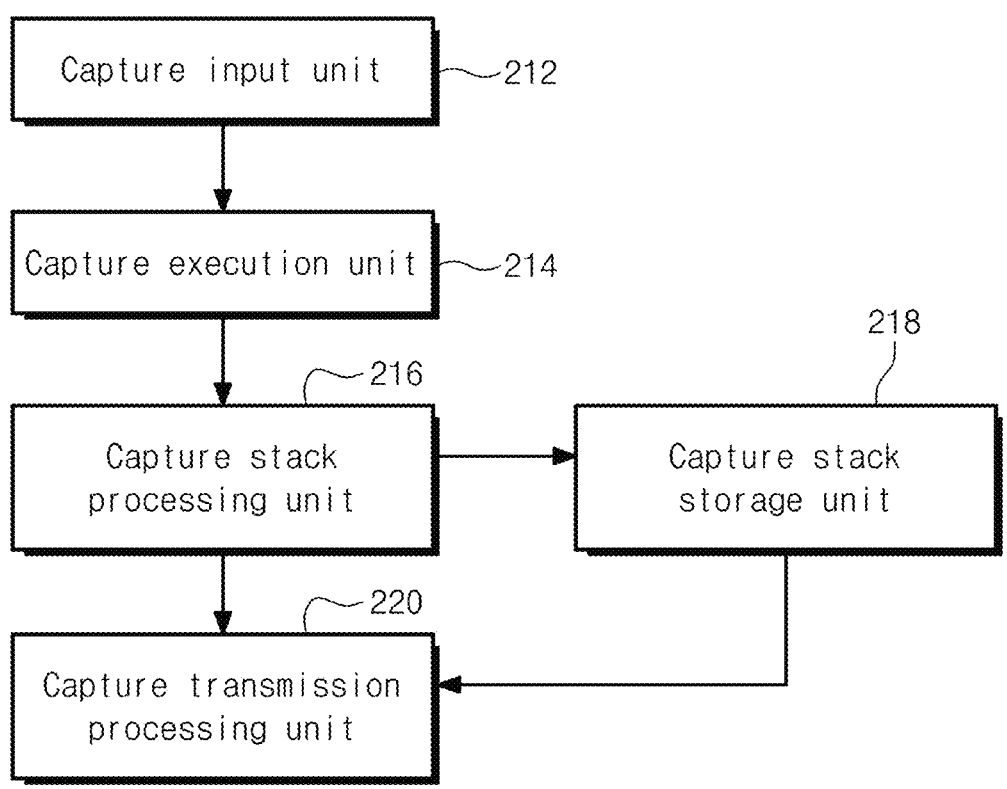
FIG. 3 is a configuration diagram of a capture review processing unit constituting a project management system according to an embodiment of the inventive concept.
Figure 4:
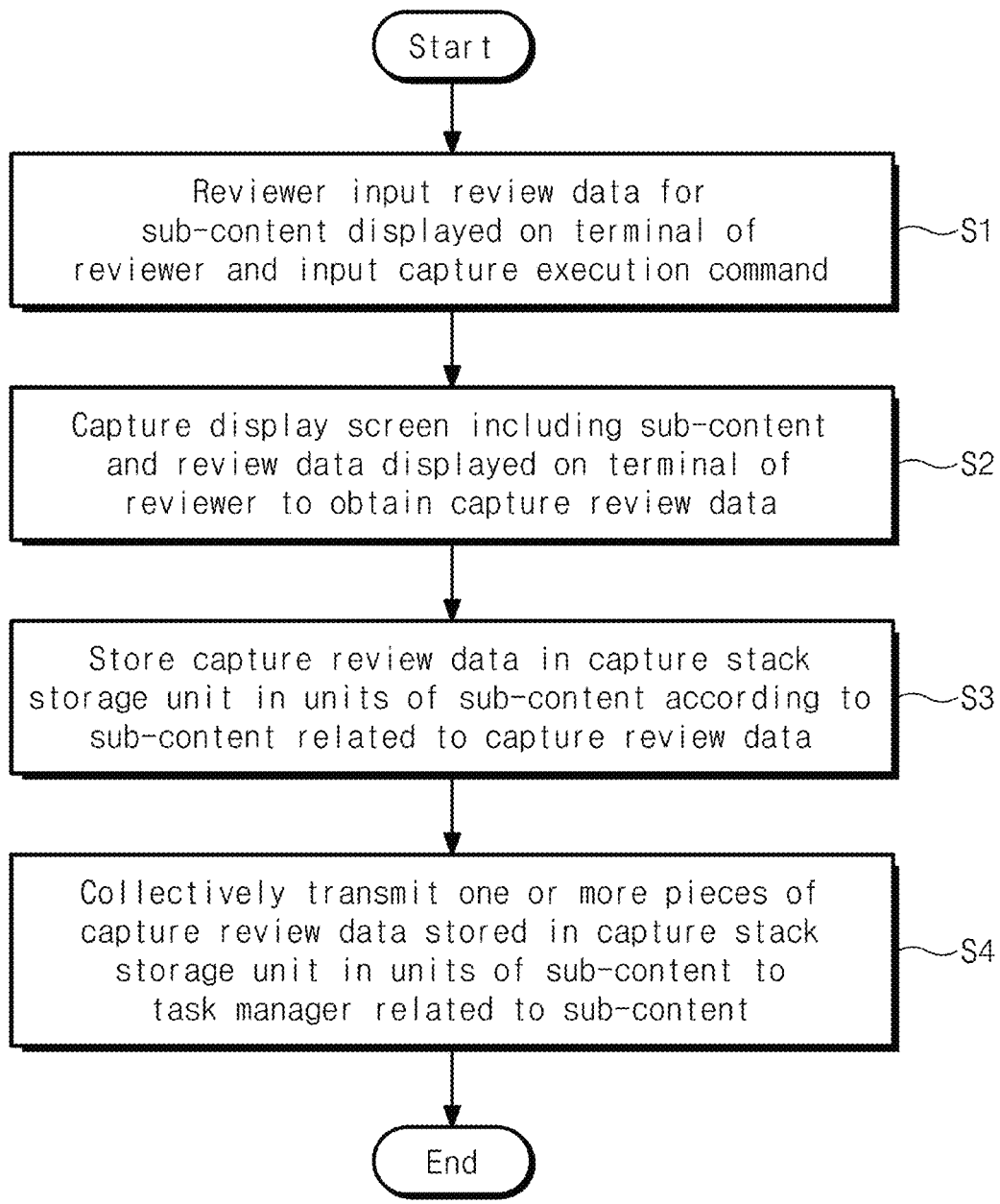
FIG. 4 is a flowchart of a project management method according to an embodiment of the inventive concept.
Figure 9:
FIG. 9 is exemplary view for describing the function of a capture review processing unit constituting a project management system according to an embodiment of the inventive concept.

FIG. 3 is a configuration diagram of a capture review processing unit constituting a project management system according to an embodiment of the inventive concept. FIG. 4 is a flowchart of a project management method according to an embodiment of the inventive concept. FIG. 9 is exemplary view for describing the function of a capture review processing unit constituting a project management system according to an embodiment of the inventive concept. Referring to FIGS. 2 to 4 and 9, the capture review processing unit 210 may include a capture input unit 212, a capture execution unit 214, a capture stack processing unit 216, a capture stack storage unit 218, and a capture transmission processing unit 220.

The capture input unit 212 may allow the reviewer to input review data for the sub-content displayed on the reviewer's terminal (sub-content worked by the task manager) and input a capture execution command by an input to a capture tool of a capture transmission tool 92 (S1). The review data may be input by a reviewer by an user interface tool 90 displayed on the terminal (e.g., various input interface such as a drawing tool such as a pen, a figure, or an eraser, a keyboard, a mouse, a touch pad, or the like).

The review data may be provided as text (e.g., change of color) related to the review, arrows or figures (circle, rectangle, oval, or the like) pointing to a task instruction part. The capture execution command may be a command for a reviewer to capture a screen, and may be implemented in various ways such as, for example, input of a capture execution icon, dragging a capture area, and a shortcut for execution of capture.

The capture execution unit 214 may obtain capture review data by capturing a display screen including sub-content and review data displayed on the terminal of the reviewer (S2). The capture review data may include a captured image and/or a captured (recorded) video obtained by capturing the screen of the terminal of the reviewer. The capture review data may be obtained by capturing a screen at the moment the reviewer inputs a capture execution command.

The captured video may be obtained by recording the screen of the reviewer's terminal while the reviewer is inputting review data. For example, screen recording may be performed in various ways, such as in a way that the reviewer enters a capture start/end icon or a start/end shortcut key at a time point when the recording is started or ended.

The capture stack processing unit 216 may store the capture review data in the capture stack storage unit 218 in units of sub-content according to the sub-content related to the capture review data. The capture stack storage unit 218 may store the capture review data generated by the capture execution unit 214 and the capture stack processing unit 216 in units of sub-content (S3). In this case, the storage location in which the capture review data is stored may be automatically determined according to the sub-content, and there is no need to designate the storage location separately by the reviewer. Pieces of capture review data for the same sub-content may be stored in the same folder, and pieces of capture review data for different sub-content may be stored in different folders.

When the reviewer inputs a tansmission tool of the capture transmission tool 92, the capture transmission processing unit 220 may collectively transmit one or more pieces of capture review data stored in units of sub-content in the capture stack storage unit 218 (e.g., pieces of capture review data in a sub-content folder) to a task manager related to the sub-content (a task manager who has worked on the sub-content) through a mail, a message, a social network service (SNS) (S4).

In this way, by integrating a plurality of pieces of capture review data in units of sub-content and transmitting the pieces of capture review data to the task manager at once, it is possible to efficiently transfer a plurality of pieces of capture review data stacked in the capture stack storage unit 218 in association to the sub-content at a time, thus enabling the task manager to collectively receive and check the plurality of pieces of capture review data related to sub-content, without a need to store the capture review data separately every time, and attach a file from the stored address and transmit the file.

In addition, according to an embodiment of the inventive concept, even when any application program such as Photoshop or YouTube is running on the terminal of the reviewer, the terminal is switched to a capture mode according to a capture execution command of the reviewer to enable the reviewer to freely make an annotation or a comment, or draw a picture or symbol to input a review, thus generating and transmitting capture review data easily to the task manager.

Figure 5:
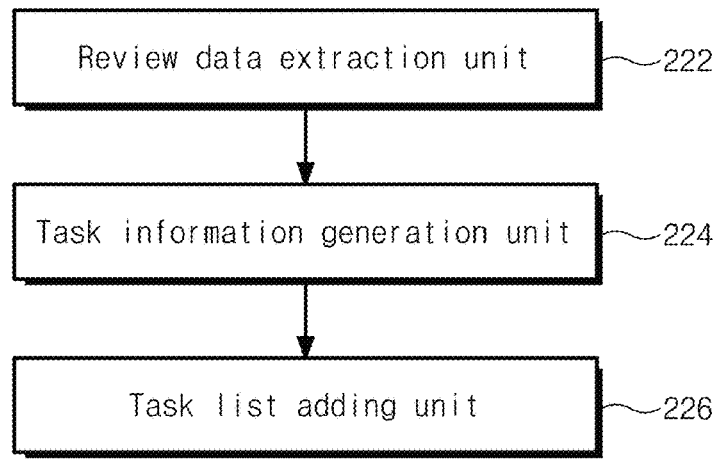
FIG. 5 is a configuration diagram of a capture review processing unit constituting a project management system having a capture review transmission function according to another embodiment of the inventive concept.
Figure 6:
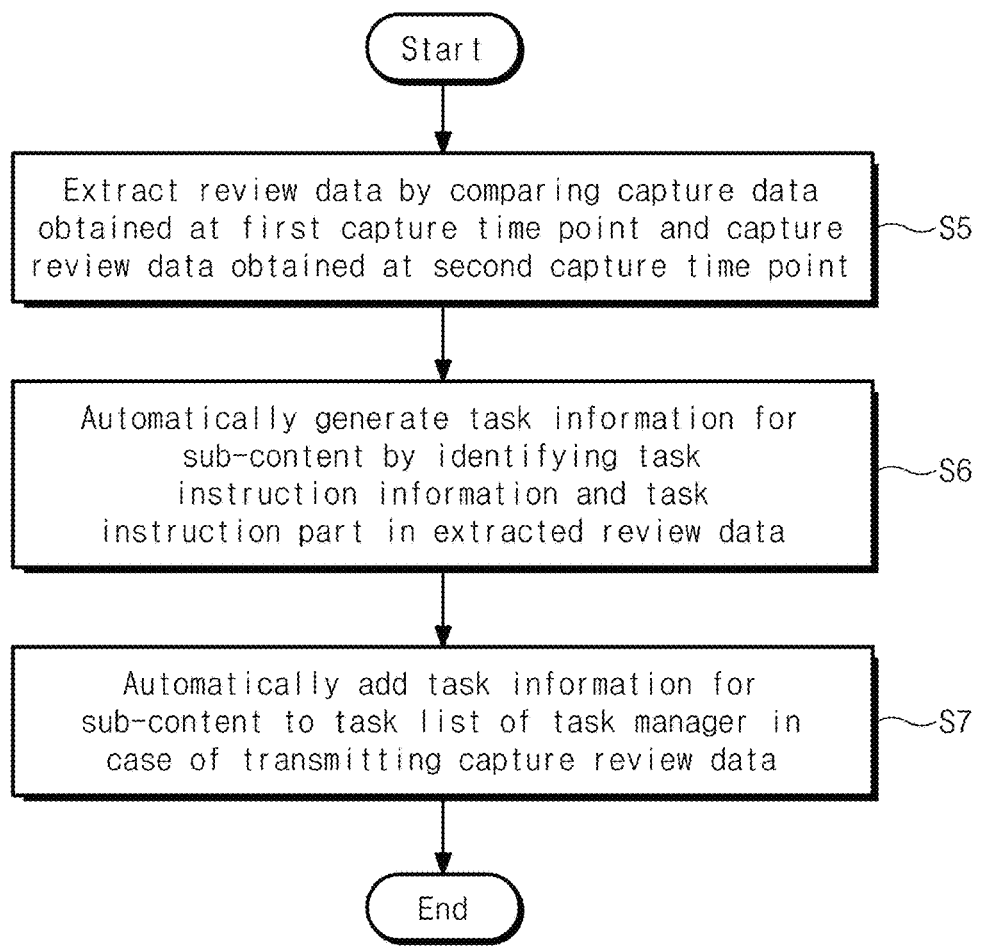
FIG. 6 is a flowchart of a process of generating task information based on capture review data and adding the task information to a task list according to an embodiment of the inventive concept.

FIG. 5 is a configuration diagram of a capture review processing unit constituting a project management system having a capture review transmission function according to another embodiment of the inventive concept. FIG. 6 is a flowchart of a process of generating task information based on capture review data and adding the task information to a task list according to an embodiment of the inventive concept.

Referring to FIGS. 2, 5 and 6, the capture review processing unit 210 may include a review data extraction unit 222, a task information generation unit 224, and a task list adding unit 226. The review data extraction unit 222 may extract review data by comparing capture data obtained at a first capture time point and capture review data obtained at a second capture time point (S5).

The first capture time point may be a time pint at which a reviewer inputs a capture execution command before the reviewer inputs the review data for sub-content. The second capture time point may be a time point at which the review manager inputs the capture execution command after completing the input of the review data for the sub-content after the first capture time point.

The review data extraction unit 222 may extract review data by calculating a difference image between capture data (captured image) obtained for the screen of the terminal of the reviewer at the first capture time point, and capture review data (capture review image) obtained for the screen of the terminal of the reviewer at the second capture time point.

The task information generation unit 224 may identify task instruction information and a task instruction part from the extracted review data and automatically generate task information for sub-content (S6). The task information generation unit 224 may identify the task instruction information by extracting text through OCR recognition on review data (a difference image between the captured image and the capture review image), for example.

For example, the task instruction information may be text information such as 'need to change color from green to yellow' and 'make line thin'. The task instruction part may be a part of the sub-content that needs to be corrected, and may be a part pointed by an identified arrow or figure in the review data. In addition, the task instruction part may include playback time/frame information of the sub-content at the time of capture based on time information or frame order information of animation, CG, advertisement video, or the like, which is displayed in the sub-content.

The task list adding unit 226 may automatically add task information (task instruction part of the sub-content, task instruction information (task instruction contents), reviewer requesting correction, task manager of sub-content) to a task list of a task manager when the capture review data is transmitted (S7). Accordingly, the task manager may check the capture review data for sub-content, which is transmitted by the reviewer, and at the same time, the task information (task item) may be automatically created in the task list, enabling efficient task creation and management without omission of tasks.

Figure 7:
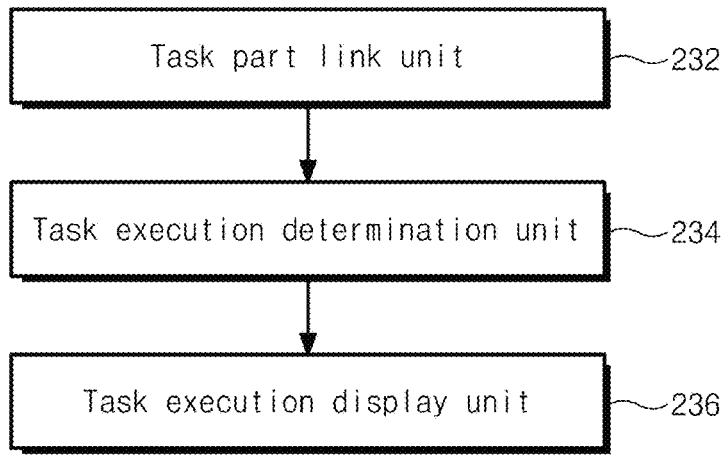
FIG. 7 is a configuration diagram of a capture review processing unit constituting a project management system having a capture review transmission function according to still another embodiment of the inventive concept.
Figure 8:
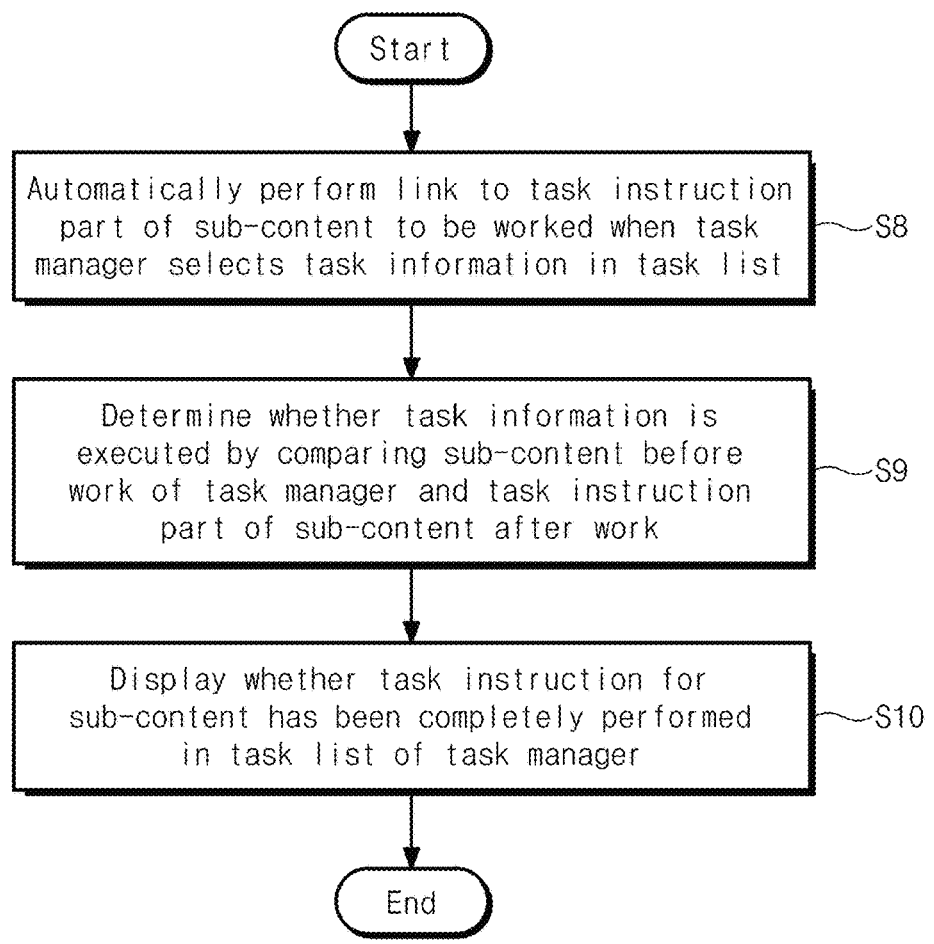
FIG. 8 is a flowchart of a process of performing automatic connection of sub-content and determining whether task information is performed according to an embodiment of the inventive concept.

FIG. 7 is a configuration diagram of a capture review processing unit constituting a project management system having a capture review transmission function according to still another embodiment of the inventive concept. FIG. 8 is a flowchart of a process of performing automatic link of sub-content and determining whether task information is executed according to an embodiment of the inventive concept.

Referring to FIGS. 2, 7 and 8, the capture review processing unit 210 may include a task part link unit 232, a task execution determination unit 234, and a task execution display unit 236. The task part link unit 232 may perform automatic link to a task instruction part of sub-content to be worked when the task manager selects task information from the task list (S8).

For example, when a task manager clicks on task information automatically created in his/her task list in association with the sub-content with a mouse, the task manager may be directly linked to a part that needs to be corrected in the sub-content, and accordingly, perform revision task more efficiently. This is possible because the task information includes information on the task instruction part.

The task execution determination unit 234 may determine whether the task information is executed by comparing the sub-content before the task manager performs the task and the task instruction portion of the sub-content after the task manager has performed the task (S9). When the task manager completes the revision task for the task instruction part and performs update, the task execution determination unit 234 may determine whether the task execution result for the task instruction part matches the task instruction information. The task execution display unit 236 may display, on the task list of the task manager, whether task information for sub-content has been executed completely (S10).

For example, when the task instruction information is 'change the color to yellow', the task manager may determine whether the color of the task instruction part, which is changed for the task instruction part of the sub-content, is yellow. When the result of task execution matches the task instruction information, a result of task execution for the task information may be displayed as 'completion of correction' in the task list, and when the result of task execution does not match the task instruction information, the result of task execution may be displayed as 'no completion of correction'. The color of a task result item may be displayed in a different color depending on whether the result of task execution matches the task instruction information (for example, blue is displayed in case of completion of correction, red is displayed in case of not completion of correction).

According to the embodiment of the inventive concept as described above, a reviewer may collectively perform capture and transmission in units of sub-content and transmit results thereof to a task manager at once, thus enabling not only the reviewer to perform a review task efficiently, but also the task manager to check the details of the revision tasks at a glance through pieces of capture review data that are sorted and transmitted in units of sub-content and efficiently perform correction tasks for the sub-content.

In addition, according to an embodiment of the inventive concept, even if the reviewer or the task manager does not separately create the task information, it is possible to prevent task omission and achieve efficiency of tack management by analyzing and automatically adding task information to a task list based on the capture review data. In addition, it is possible to effectively figure out the progress of the correction task by checking whether the task manager has corrected the sub-content according to the contents of the task instruction, through the task list.

The task distribution unit 110 may determine first task managers and second task managers according to the task attributes of first tasks and the task attributes of second tasks and the set roles of the task managers and distribute the first tasks and the second tasks.

The content task unit 120 may support the first task managers and the second task managers to perform the first tasks and the second tasks according to the task attributes of the first tasks and the second tasks.

The content upload unit 130 may upload first sub-content produced for each version in a process in which the first tasks are sequentially performed, and second sub-content produced for each version in a process in which the second tasks are sequentially performed.

The content version management unit 140 may manage first version information of the first sub-content that is sequentially uploaded in the execution order of the first tasks, and second version information of the second sub-content that is sequentially uploaded in the execution order of the second tasks. The version of the content may include versions such as an original drawing version, a coloring version, a retake version, and a confirmed version.

The history for each task type is sequentially recorded by the content version management unit 140, and thus progress details such as a specific shot or a scenario may be checked at once based on the version information managed by the content version management unit 140.

Figure 10B:
Figure 11:
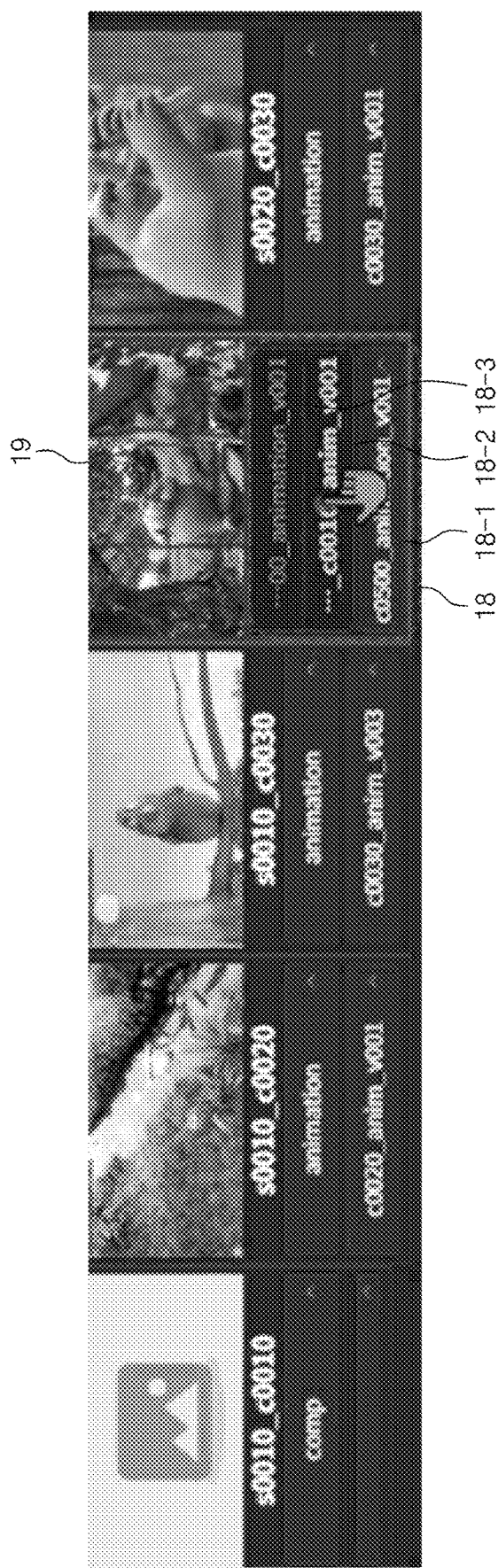
FIG. 11 is an enlarged view of the sub-content information display unit shown in FIG. 10B.

FIGS. 10A and 10B are exemplary views for describing the function of a content version management unit constituting a project management system according to an embodiment of the inventive concept. FIG. 11 is an enlarged view of the sub-content information display unit shown in FIG. 10B.

The content version management unit 140 may display a sub-content information display unit 11 capable of enabling information on a task history for each sub-content in units of shots, scenarios, or the like to be checked on the screen of the terminal of a task manager.

The sub-content information display unit 11 may display clips of pieces of sub-content 12, 13, 14, and 15 arranged on timeline, and display, together with a thumbnail image 19, attribute information of sub-content, such as title, content type (e.g., animation, CG, advertisement video), version information 18 summarized for each sub-content 12, 13, 14, or 15 related to a task assigned to the task manager.

When the task manager selects and executes sub-content on the sub-content information display unit 11, the sub-content is reproduced on a content display screen 16. In this case, the task manager may reproduce version information 18-1, 18-2, or 18-3 of the sub-content on the sub-content information display unit 11 while variously switching the version thereof into an original drawing version, a coloring version, and the like.

In this case, when the task manager intends to input an annotation on the sub-content being reproduced on the content display screen 16, the task manager may select (e.g., touch or click on) an annotation input item 17 displayed on the screen of the terminal and input an annotation in association with relevant sub-content.

The content execution unit 150 may execute at least one of first sub-content and second sub-content to be displayed on the content display screen according to a content execution command of at least one task manager.

The annotation input unit 160 may add an annotation or input a comment (e.g., a description or a direction) in association with the first tasks and the second tasks according to the inputs of the first task managers and the second task managers.

The annotation input unit 160 may provide an input interface for enabling task managers to input information related to tasks. The annotation input unit 160 may be provided such that task managers input various information to be used for tasks, such as a camera, a lens, a pen, a color, and the number of frames.

The annotation input unit 160 may enable, for example, task managers to input annotations or comments in various ways, such as, by making a sketch on the screen of the terminal using an input interface, using a tablet pen, or typing text onto a comment input item.

The annotation management unit 170 may record an annotation or comment together with the input time of the annotation or comment in an annotation history. Also, the annotation management unit 170 may store a feedback comment on a screening execution result input by a screening task manager in the annotation history.

As described above, the annotation or comment input by the task manager through the annotation input unit 160 may be recorded in the annotation history by the annotation management unit 170, and the annotation history may be shared with all of task managers related to content production. On the other hand, when the task manager inputs a capture execution command in a state in which an annotation is input, it may be implemented that the screen of the terminal of a task manager "A" is captured to generate capture review data, and the capture review data is transmitted to the terminal of a task manager "B" for a corresponding content part.

The screening processing unit 180 may execute a screening function of connecting and reproducing first sub-content and second sub-content produced through first tasks and second tasks.

When the order of several shots to be worked is determined and the detailed tasks are assigned to task managers, the task managers may perform the assigned tasks and upload the tasks. In this case, version information of the uploaded task results (sub-content) may be recorded.

In a case where the task results are uploaded as described above, when the screening task manager may merely designate one or more pieces of sub-content among results (pieces of sub-content) worked by the task managers, the pieces of sub-content uploaded by the task managers may be continuously reproduced according to a determined shot order.

Therefore, the screening task manager may perform a screening task conveniently on a web with a simple operation such as selecting sub-content and inputting only a screening command, without a need to download a video in the unit of a cut and perform a task using a separate editor (e.g., Premiere, or Final Cut) to check the connectivity of an entire video.

The task progress management unit 190 may manage the progress of tasks for content production. The task progress management unit 190 may quantitatively analyze task execution result details and the amount of an assigned task for each task manager, and the task execution rate for each content.

The task progress management unit 190 may designate or change a task manager to be in charge of a task based on task execution result details and the amount of the assigned task for each task manager, and the task execution rate for each content. The task progress management unit 190 may analyze a task priority for each task manager based on task execution result details and the amount of the assigned task for each task manager, and the task execution rate for each content.

The notification transmission unit 200 may generate an annotation or comment notification to a manager related to sub-content based on version information of sub-content related to which the annotation or comment is input. In addition, the notification transmission unit 200 may notify a feedback comment of the screening task manager to task managers related to pieces of sub-content for which feedback is input.

In addition, the notification transmission unit 200 may notify the designation or change of a task manager to the first task managers of which the task are designated or changed and notify the priority of the tasks to each task manager. The notification transmission unit 200 may transmit a notification to a task manager in various ways, such as transmitting a message to the terminal of the task manager, generating a push alarm, or sending an email.

Hereinafter, a project management method having a screening function of supporting production and connection reproduction of pieces of sub-content by division of labor and collaboration according to an embodiment of the inventive concept will be described with reference to FIGS. 12 to 17.

Referring to FIGS. 1, 2, and 12 to 17, the project management method having a screening function of supporting production and connection reproduction of pieces of sub-content by division of labor and collaboration according to an embodiment of the inventive concept may be performed by the terminals 20 of a plurality of task managers and the project management server 30.

The project management method having a screening function of supporting production and connection reproduction of pieces of sub-content by division of labor and collaboration according to an embodiment of the inventive concept may include processes for managing a project for producing content including a plurality of pieces of sub-content by division of labor and collaboration of a plurality of task managers.

Figure 12:
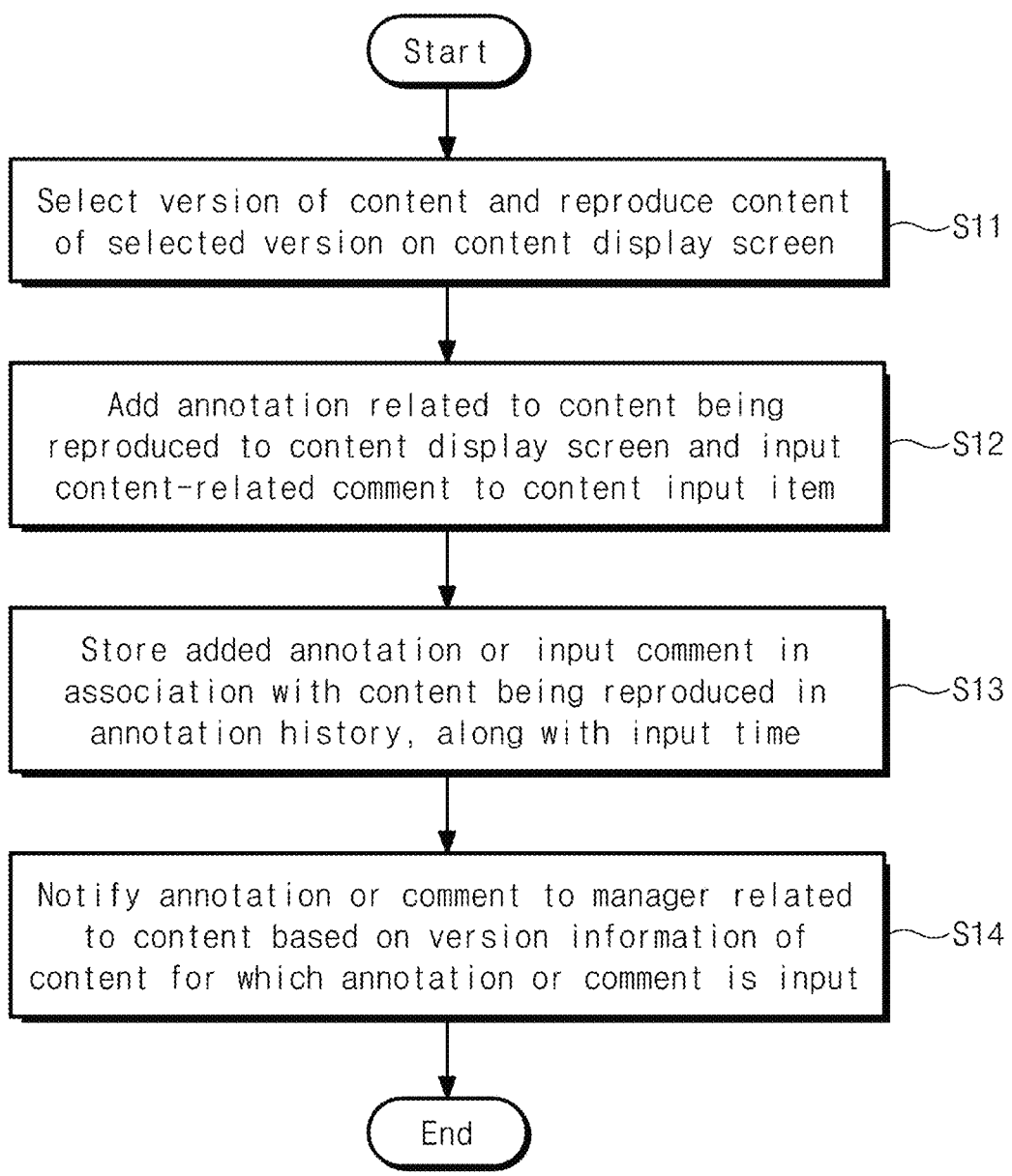
FIG. 12 is a flowchart illustrating a process of sharing an annotation or a comment among task managers by the project management method according to an embodiment of the inventive concept.
Figure 13:
FIGS. 13 and 14 are exemplary diagrams for describing a process by which a task manager inputs an annotation and a comment according to an embodiment of the inventive concept.
Figure 14:

FIG. 12 is a flowchart illustrating a process of sharing an annotation or a comment among task managers by the project management method according to an embodiment of the inventive concept. FIGS. 13 and 14 are exemplary diagrams for describing a process by which a task manager inputs an annotation and a comment according to an embodiment of the inventive concept.

Referring to FIGS. 1, 2, and 12 to 14, a task manager may select a version of the content from a sub-content display unit displayed on a terminal and reproduce content of a selected version on a content display screen 21 (S11).

The project management unit 60 may share the annotations or comments input for the first sub-content among the first task managers when the first tasks are being sequentially performed.

In addition, the project management unit 60 may share the annotations or comments input for the second sub-content among the second task managers when the second tasks are being sequentially performed.

The annotation input unit 160 may add an annotation or input a comment (e.g., a description or a direction) in association with the first tasks and the second tasks according to the inputs of the first task managers and the second task managers.

The annotation input unit 160 may provide an input interface for enabling task managers to input information related to the tasks. The annotation input unit 160 may display an input tool selection unit 22 for selecting an annotation input tool and a comment input selection unit 24 for inputting a comment on the screen of the terminal of a task manager.

The input tool selection unit 22 may be provided to select options, such as an annotation input tool, for example, a type, pen color, pen thickness, erasing, and figure (for example, circle or rectangle) to be input onto a screen shot of sub-content being reproduced on the content display screen 21.

A comment input unit 25 may be provided such that a task manager inputs text such as directions into the text input unit. In addition to the annotations recorded onto the screen shot of sub-content, the color and thickness of text input to the comment input unit 25 may be provided to be selectable by the task manager.

In this way, the task manager may input annotations or comments in various ways, such as, by making a sketch on the screen of the terminal using an input interface, using a tablet pen, or typing text onto a comment input item (S12). Such an annotation or comment may be included in the capture review data when the capture execution command is input by the task manager and transmitted to the terminal of a task manager related to a relevant content part.

The annotation management unit 170 may record an annotation or comment together with the input time of the annotation or comment in an annotation history. Also, the annotation management unit 170 may store a feedback comment on a screening execution result input by a screening task manager in the annotation history (S13).

As described above, the annotation or comment input by the task manager through the annotation input unit 160 may be recorded in the annotation history by the annotation management unit 170, and the annotation history may be shared with all of task managers related to content production.

The annotation management unit 170 may allow task-related information to be selectively shared among specific task managers based on the continuity of pieces of sub-content, rather than sharing an annotation history with all of task managers related to content.

For example, when a first task manager assigned a task for first sub-content adds an annotation or input a comment about the task, the annotation management unit 170 may share an annotation history with not only a task manager who has performed a pre-task on the first sub-content and a task manager who is going to perform post-task but also a task manager related to a task for second sub-content (sub-content preceding or following the first sub content) and transmit notification through the notification transmission unit 200.

The notification transmission unit 200 may generate an annotation or comment notification to a manager related to sub-content based on version information of sub-content related to which the annotation or comment is input. In addition, the notification transmission unit 200 may notify a feedback comment of the screening task manager to task managers related to pieces of sub-content for which feedback is input (S14).

The notification transmission unit 200 may transmit a notification related to adding of annotation, inputting of comment, or the like to a task manager in various ways, such as transmitting a message to the terminal 20 of the task manager, generating a push alarm, or sending an email.

Figure 15:
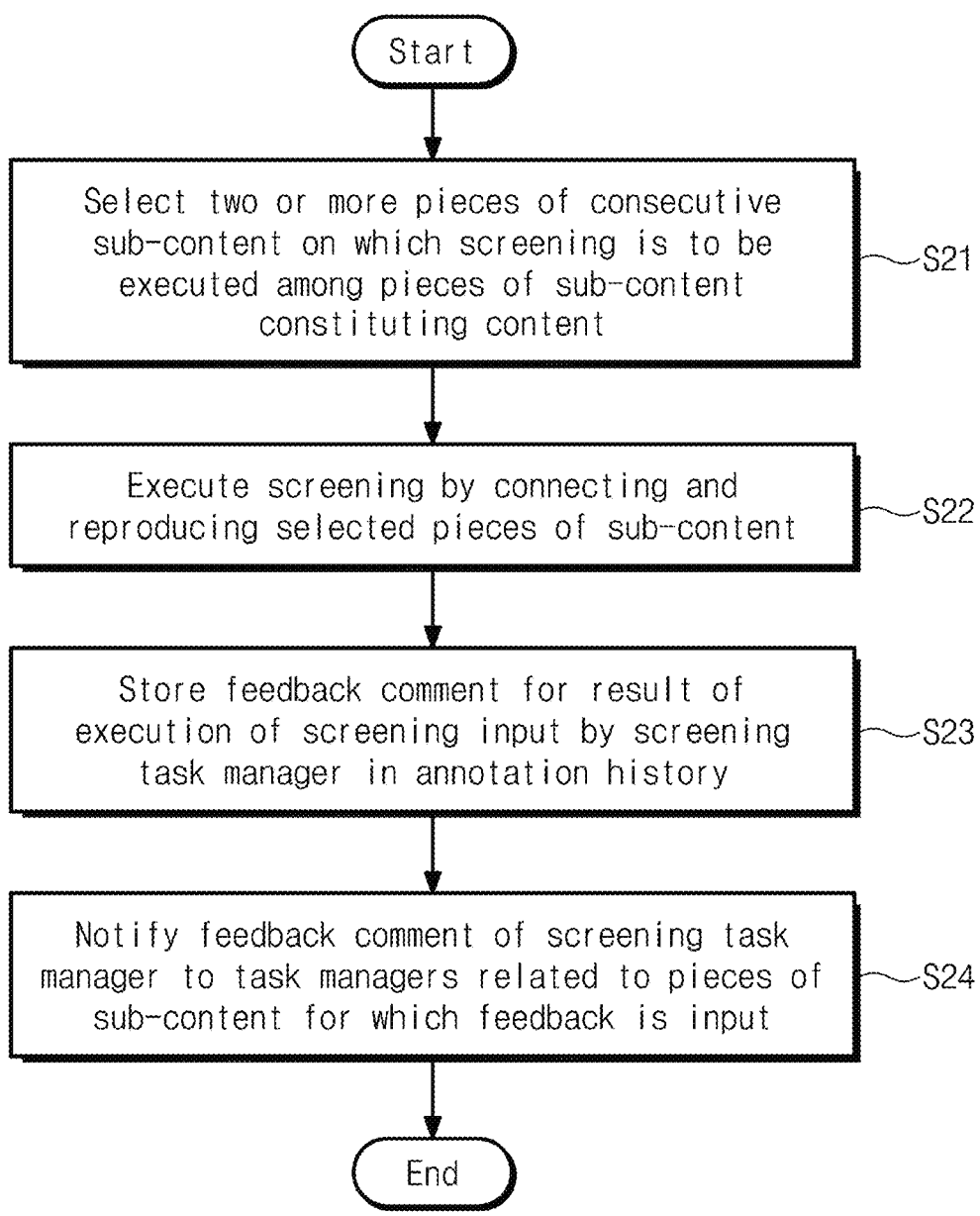
FIG. 15 is a flowchart of a process of performing a screening function according to an embodiment of the inventive concept.

FIG. 15 is a flowchart of a process of performing a screening function according to an embodiment of the inventive concept. The project management unit 60 may perform a screening function of connecting and reproducing pieces of sub-content produced by division of labor and collaboration by a plurality of task managers, that is, first sub-content produced through the first tasks and second sub-content produced through the second tasks.

In an embodiment, the content may include at least one of computer graphics, animation, and advertisement videos. The content may include two or more sub-content. A plurality of pieces of sub-content may include first sub-content and second sub-content which are continuously reproduced with time.

In this case, the last frame of the first sub-content and the first frame of the second sub-content may be consecutive frames in the content, and final content may be produced through a process of combining two or more pieces of first sub-content and second sub-content The project management unit 60 may generate first tasks to be sequentially performed in time series to produce the first sub-content. Also, the project management unit 60 may generate second tasks to be sequentially performed in time series to produce the second sub-content.

The project management unit 60 may distribute the first tasks to first task managers according to task attributes of the first tasks and roles set for the task managers. In addition, the project management unit 60 may distribute the second tasks to second task managers according to task attributes of the second tasks and roles set for the task managers.

The first tasks may include an original drawing task, a coloring task, a 3D modeling task, and a confirmation determining (or rejection determining) task for production of the first sub-content. The second tasks may include an original drawing task, a coloring task, a 3D modeling task, and a confirmation determining (or rejection determining) task for production of the second sub-content.

The screening processing unit 180 may select two or more pieces of consecutive sub-content for executing a screening function from among sub-content constituting content according to the input of a task manager (S21).

The screening processing unit 180 may perform screening by connecting and reproducing the selected pieces of sub-content. That is, the screening processing unit 180 may connect and reproduce first sub-content and second sub-content produced through first tasks and second tasks.

Also, the screening processing unit 180 may store a feedback comment on a result of execution of the screening function input by a screening task manager in the annotation history (S23).

When the screening task manager inputs a feedback comment, a feedback comment of the screening task manager is notified and transmitted to task managers related to pieces of sub-content for which feedback is input (S24).

Figure 16:
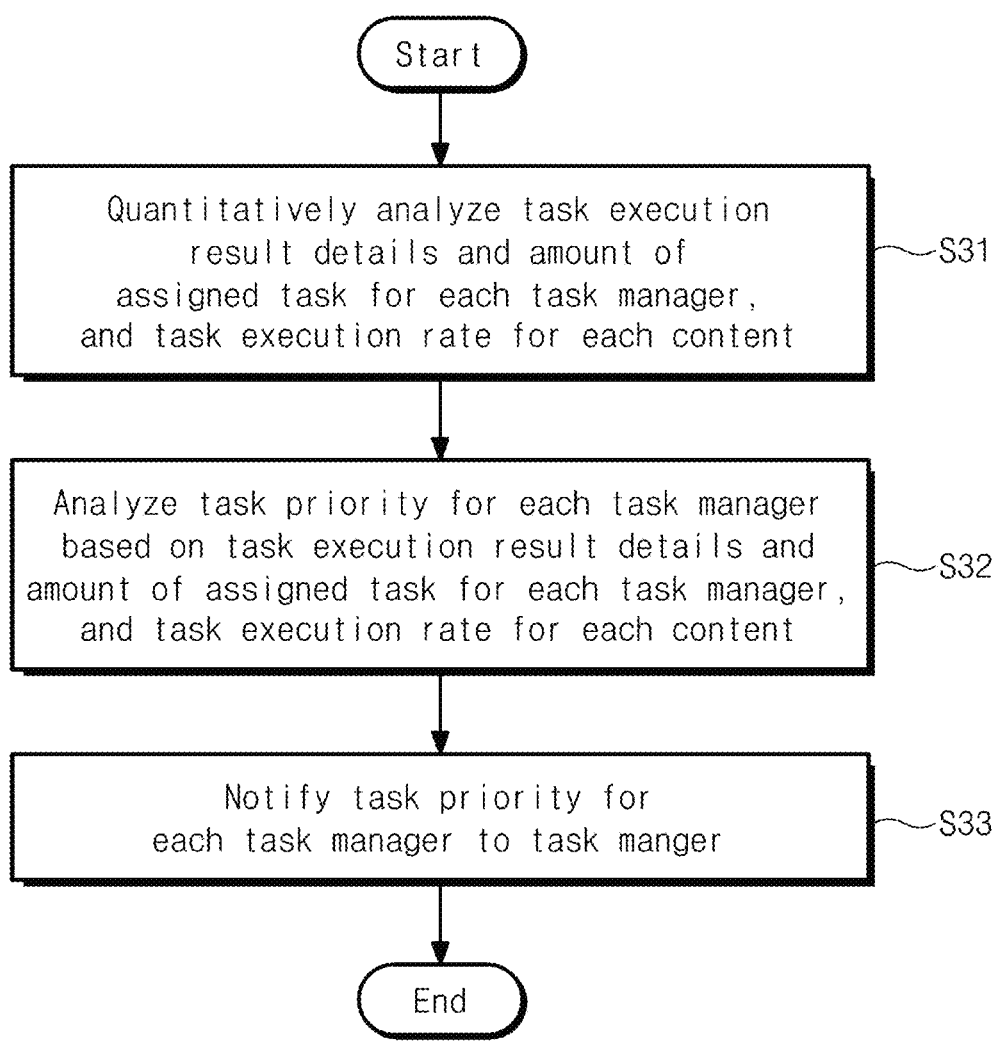
FIG. 16 is a flowchart of a process of analyzing a task priority of a task manager according to an embodiment of the inventive concept.

FIG. 16 is a flowchart of a process of analyzing a task priority of a task manager according to an embodiment of the inventive concept. Referring to FIGS. 2 and 16, the task distribution unit 110 may determine first task managers and second task managers according to the task attributes of first tasks and the task attributes of second tasks and the set roles of the task managers and distribute the first tasks and the second tasks.

The task distribution unit 110 may distribute tasks according to the roles of task managers (e.g., computer graphic task, animation task, advertisement image production task, original drawing task, coloring task, 3D modeling task, screening confirmation/rejection task, or the like), when the tasks are distributed.

In addition, the task distribution unit 110 may predict the completion date of a corresponding task in consideration of the amount of the task currently assigned to the task manager and a task deadline when the task is distributed to a corresponding task manager, and distribute the task to another task manager when it is determined that the predicted completion date of the task is delayed beyond a set reference date.

The task progress management unit 190 may manage the progress of tasks for content production. The task progress management unit 190 may quantitatively analyze task execution result details and the amount of the assigned task for each task manager, and the task execution rate for each content (S31).

The task progress management unit 190 may analyze a task priority for each task manager based on task execution result details and the amount of the assigned task for each task manager, and the task execution rate for each content (S32).

For example, when another task manager who needs to perform another task subsequently to a corresponding specific task is unable to do any task due to the task manager delaying the specific task, the task progress management unit 190 may determine that the corresponding task manager needs to execute a task in preference to the specific task.

In addition, the task progress management unit 190 may have a function of managing the progress of tasks related to the pieces of consecutive sub-content based on whether the pieces of sub-content are consecutive or not.

The task progress management unit 190 may determine whether a difference between a task progress rate of first sub-content and a task progress rate of second sub-content exceeds a set reference value, with respect to the first sub-content and the second sub-content that are consecutive within content.

The task progress management unit 190 may notify a task manager with a lower work progress rate (for example, a task manager related to first sub-content) of the task progress rate and difference of the preceding sub-content or the following sub-content or prompt the progress of the task through the notification transmission unit 200.

The notification transmission unit 200 may notify each task manager of a task priority of tasks (S33). The notification transmission unit 200 may notify and transmit the task priority to a task manager in various ways, such as transmitting a message to the terminal of the task manager, generating a push alarm, or sending an email.

Figure 17:
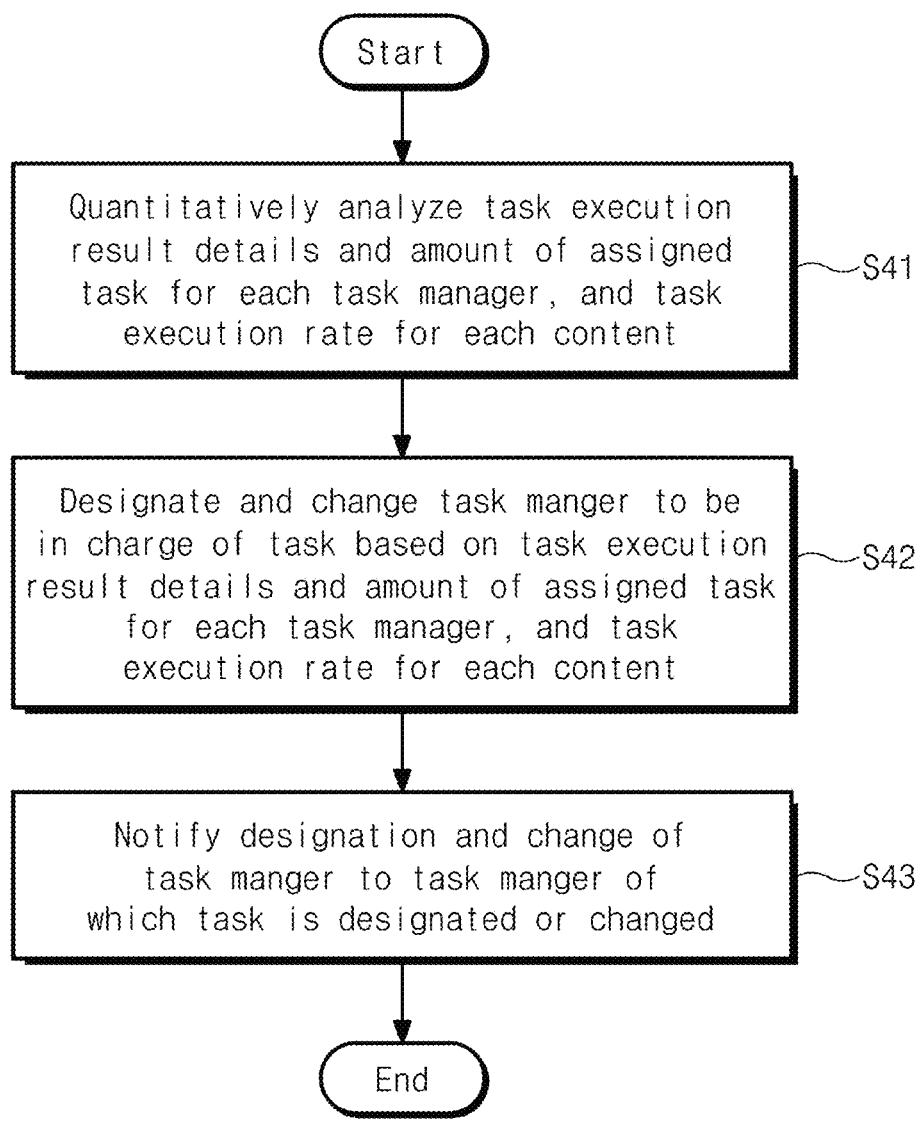
FIG. 17 is a flowchart of a process of notifying designation and change of tasks to a task manager according to an embodiment of the inventive concept.

FIG. 17 is a flowchart of a process of notifying a task manager of designation or change of a task according to an embodiment of the inventive concept. Referring to FIGS. 2 and 17, the task progress management unit 190 may manage the progress of tasks for content production. The task progress management unit 190 may quantitatively analyze task execution details and the amount of an assigned task for each task manager, and the task execution rate for each content (S41).

The task progress management unit 190 may designate or change a task manager to be in charge of a task based on task execution result details and the amount of the assigned task for each task manager, and the task execution rate for each content (S42).

The notification transmission unit 200 may notify the designation or change of a task manager of the first task managers of which the task are designated or changed (S43). The notification transmission unit 200 may transmit a notification to a task manager in various ways, such as transmitting a message to the terminal of the task manager, generating a push alarm, or sending an email.

The embodiments described herein may be implemented with hardware components and software components and/or a combination of the hardware components and the software components. For example, the apparatus, method and components described in the embodiments may be implemented using one or more general-purpose or special purpose computers, such as a processor, a controller and an arithmetic logic unit (ALU), a digital signal processor, a microcomputer, a field programmable array (FPGA), a programmable logic unit (PLU), a microprocessor or any other device capable of executing and responding to instructions.

The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements.

For example, the processing device may include multiple processors or a single processor and a single controller. In addition, different processing configurations are possible, such a parallel processors. The software may include a computer program, a piece of code, an instruction, or some combination thereof, for independently or collectively instructing or configuring the processing device to operate as desired.

Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the present invention, or they may be of the kind well-known and available to those having skill in the computer software arts.

Examples of computer readable recording media include magnetic media such as hard disks, floppy disks and magnetic tape, optical media such as CD-ROMs, DVDs, and magnetic disks such as floppy disks, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present invention, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved. Therefore, other implementations, other embodiments, and equivalents to the claims are within the scope of the following claims.

According to the embodiments of the inventive concept, it is possible to provide a project management system having a capture review transmission function for implementing an effective online review system and a method thereof.

According to the embodiments of the inventive concept, it is possible to provide a project management system having a screening function that supports production and connection and reproduction of pieces of sub-content by division of labor and collaboration and a method thereof.

According to the embodiments of the inventive concept, it is possible to provide a project management system capable of efficiently sharing task-related information among task managers in a process of producing content by division of labor and collaboration and a method thereof.

According to the embodiments of the inventive concept, it is possible to a project management system capable of efficiently managing tasks by easily figuring out task progress of each task and each task manager and the task priority of the task manager and a method thereof.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A project management method for managing a project for creating content including a plurality of sub-content by division of labor and collaboration of a plurality of task managers, comprising:
performing, by a capture review processing unit, a capture review transmission function of generating capture review data for sub-content worked by a task manager and transmitting the capture review data to a terminal of the task manager,
wherein the performing of the capture review transmission function includes:
receiving, by a capture input unit, review data and a capture execution command for the sub-content displayed on a terminal of a reviewer who performs a review task for the sub-content;
capturing, by a capture execution unit, a display screen including the sub-content and the review data displayed on the terminal of the reviewer to obtain the capture review data;
storing, by a capture stack processing unit, the capture review data in a capture stack storage unit in units of sub-content according to sub-content related to the capture review data; and
collectively transmitting, by a capture transmission processing unit, one or more pieces of capture review data stored in the units of sub-content to a terminal of a task manager related to the sub-content,
wherein the plurality of pieces of sub-content include first sub-content and second sub-content which are continuously reproduced with time,
wherein the project management method further comprises:
generating first tasks to be sequentially performed in time series to produce the first sub-content;
generating second tasks to be sequentially performed in time series to produce the second sub-content;
distributing the first tasks to first task managers among the task managers according to task attributes of the first tasks and set roles of the task managers;
distributing the second tasks to second task managers among the task managers according to task attributes of the second tasks and set roles of the task managers; and performing a screening function of connecting and reproducing the first sub-content and the second sub-content produced by the first tasks and the second tasks.

2. The project management method of claim 1, wherein the performing of the capture review transmission function includes:
   extracting, by a review data extraction unit, the review data by comparing capture data obtained at a first capture time point and the capture review data obtained at a second capture time point;
   identifying, by a task information generation unit, task instruction information and a task instruction part from the extracted review data to automatically generate task information for the sub-content;
   automatically adding, by a task list adding unit, the task information for the sub-content to a task list of the task manager when the capture review data is transmitted.

3. The project management method of claim 2, wherein the performing of the capture review transmission function includes:
   automatically linking, a task part link unit, the task information to a task instruction part of sub-content to be worked when the task manager selects the task information from the task list;
   determining, a task execution determination unit, whether the task information is executed by comparing the sub-content before the task manager performs the task and the task instruction part of the sub-content after the task manager has performed the task; and
   displaying, a task execution display unit, whether the task information for the sub-content has been completed on the task list of the task manager.

4. The project management method of claim 1, further comprising:
   determining, by a task distribution unit, first task managers and second task managers according to the task attributes of first tasks and the task attributes of second tasks and the set roles of the task managers and distributing the first tasks and the second tasks;
   supporting, by a content task unit, the first task managers and the second task managers to execute the first tasks and the second tasks according to the task attributes of the first tasks and the second tasks;
   uploading, by a content upload unit, the first sub-content produced for each version in a process in which the first tasks are sequentially performed, and the second sub-content produced for each version in a process in which the second tasks are sequentially performed;
   managing, by a content version management unit, first version information of the first sub-content that is sequentially uploaded in an execution order of the first tasks, and second version information of the second sub-content that is sequentially uploaded in an execution order of the second tasks;
   executing, by a content execution unit, at least one of the first sub-content and the second sub-content to be displayed on a content display screen according to a content execution command of at least one task manager; and
   performing, by a screening processing unit, a screening function of connecting and reproducing the first sub-content and the second sub-content produced by the first tasks and the second tasks.

5. The project management method of claim 4, further comprising:
   managing, by a task progress management unit, progress of tasks for the production of the content,
   wherein the managing of the progress of tasks includes:
      quantitatively analyzing task execution result details for each task manager, the amount of an assigned work, and a work performance rate for each content;
      designating or changing a first task manager to be in charge of a task based on the task execution result details for each task manager, the amount of the assigned task, and the task execution rate for each content;
      analyzing a task priority for each task manager based on the task execution result details and the amount of the assigned task for each task manager, and the task execution rate for each content;
      notifying designation or change of a task manager to the first task manager of which the task is designated or changed; and
      notifying the task priority of the tasks for each task manager.

6. A non-transitory computer-readable recording medium recording a program for executing the project management method of claim 1.

7. A project management system for managing a project for producing content including a plurality of pieces of sub-content by division of labor and collaboration of a plurality of task managers, comprising:
   a project management unit configured to communicate with terminals of the plurality of task managers to manage the project,
   wherein the project management unit includes:
   a capture review processing unit configured to generate capture review data for sub-content worked by a task manager and transmit the capture review data to a terminal of the task manager,
   wherein the capture review processing unit includes:
      a capture input unit configured to receive review data and a capture execution command for the sub-content displayed on a terminal of a reviewer who performs a review task for the sub-content;
      a capture execution unit configured to capture a display screen including the sub-content and the review data displayed on the terminal of the reviewer to obtain the capture review data;
      a capture stack processing unit configured to store the capture review data in a capture stack storage unit in units of sub-content according to sub-content related to the capture review data; and
      a capture transmission processing unit configured to collectively transmit one or more pieces of capture review data stored in the units of sub-content to a terminal of a task manager related to the sub-content,
   wherein the plurality of pieces of sub-content include first sub-content and second sub-content which are continuously reproduced with time,
   wherein the project management unit is further configured to:
      generate first tasks to be sequentially performed in time series to produce the first sub-content;
      generate second tasks to be sequentially performed in time series to produce the second sub-content;
      distribute the first tasks to first task managers among the task managers according to task attributes of the first tasks and set roles of the task managers;
      distribute the second tasks to second task managers among the task managers according to task attributes of the second tasks and set roles of the task managers; and perform a screening function of connecting and reproducing the first sub-content and the second sub-content produced by the first tasks and the second tasks.

8. The project management system of claim 7, wherein the capture review data includes at least one of a capture image obtained by capturing a screen of the terminal of the reviewer and a recorded video obtained by recording the screen of the terminal of the reviewer.

9. The project management system of claim 7, wherein a storage location in which the capture review data is stored in the capture stack storage unit is automatically determined according to the sub-content.

10. The project management system of claim 7, wherein the capture review processing unit further includes:
a review data extraction unit configured to extract the review data by comparing capture data obtained at a first capture time point and the capture review data obtained at a second capture time point;
a task information generation unit configured to identify task instruction information and a task instruction part from the extracted review data and automatically generate task information for the sub-content; and
a task list adding unit configured to automatically add the task information for the sub-content to a task list of the task manager when the capture review data is transmitted.

11. The project management system of claim 10, wherein the capture review processing unit further includes:
a task part link unit configured to automatically link the task information to a task instruction part of sub-content to be worked when the task manager selects the task information from the task list;
a task execution determination unit configured to determine whether the task information is executed by comparing the sub-content before the task manager performs the task and the task instruction part of the sub-content after the task manager has performed the task; and
a task execution display unit configured to display whether the task information for the sub-content has been completed on the task list of the task manager.

12. The project management system of claim 7, wherein the content includes at least one of computer graphics, animation, and advertisement videos,
wherein the first tasks include an original drawing task, a coloring task, a 3D modeling task, and a confirmation determining task for production of the first sub-content, and
wherein the second tasks include an original drawing task, a coloring task, a 3D modeling task, and a confirmation determining task for production of the second sub-content.

13. The project management system of claim 7, wherein the project management unit further includes:
a task distribution unit configured to determine first task managers and second task managers according to task attributes of first tasks and second tasks, and set roles of the task managers and distribute the first tasks and the second tasks;
a content task unit configured to support the first task managers and the second task managers to execute the first tasks and the second tasks according to the task attributes of the first tasks and the second tasks;
a content upload unit configured to upload the first sub-content produced for each version in a process in which the first tasks are sequentially performed, and the second sub-content produced for each version in a process in which the second tasks are sequentially performed;
a content version management unit configured to manage first version information of the first sub-content that is sequentially uploaded in an execution order of the first tasks, and second version information of the second sub-content that is sequentially uploaded in an execution order of the second tasks;
a content execution unit configured to execute at least one of the first sub-content and the second sub-content to be displayed on a content display screen according to a content execution command of at least one task manager; and
a screening processing unit configured to perform a screening function of connecting and reproducing the first sub-content and the second sub-content produced by the first tasks and the second tasks.

14. The project management system of claim 7, wherein the project management unit further includes a task progress management unit configured to manage progress of tasks for production of the content, and a notification transmission unit configured to notify a task,
wherein the task progress management unit is further configured to:
quantitatively analyze task execution result details and the amount of an assigned task for each task manager, and a task execution rate for each content;
designate or change a first task manager to be in charge of a task based on the task execution result details and the amount of the assigned task for each task manager, and the task execution rate for each content; and
analyze a task priority for each task manager based on the task execution result details and the amount of the assigned task for each task manager, and the task execution rate for each content, and
wherein the notification transmission unit is further configured to:
notify designation or change of a task manager to the first task manager of which the task is designated or changed; and
notify the task priority of the tasks for each task manager.

* * * * *